US009836657B2

(12) United States Patent
Hilldore et al.

(10) Patent No.: US 9,836,657 B2
(45) Date of Patent: Dec. 5, 2017

(54) SYSTEM AND METHOD FOR PERIODIC LANE MARKER IDENTIFICATION AND TRACKING

(71) Applicant: Gentex Corporation, Zeeland, MI (US)

(72) Inventors: Benjamin B. Hilldore, Holland, MI (US); Brock R. Rycenga, Wyoming, MI (US); Micah W. TerHaar, Denver, CO (US)

(73) Assignee: GENTEX CORPORATION, Zeeland, MI (US)

( * ) Notice: Subject to any disclaimer, the term of this patent is extended or adjusted under 35 U.S.C. 154(b) by 132 days.

(21) Appl. No.: 14/750,234

(22) Filed: Jun. 25, 2015

(65) Prior Publication Data
US 2015/0294165 A1  Oct. 15, 2015

Related U.S. Application Data

(62) Division of application No. 13/559,994, filed on Jul. 27, 2012, now Pat. No. 9,098,751.

(60) Provisional application No. 61/512,213, filed on Jul. 27, 2011, provisional application No. 61/512,158, filed on Jul. 27, 2011.

(51) Int. Cl.
*G06K 9/00* (2006.01)
*G06T 5/40* (2006.01)

(52) U.S. Cl.
CPC ..... *G06K 9/00798* (2013.01); *G06K 9/00791* (2013.01); *G06T 5/40* (2013.01)

(58) Field of Classification Search
None
See application file for complete search history.

(56) References Cited

U.S. PATENT DOCUMENTS

| 4,970,653 | A | 11/1990 | Kenue |
| 5,220,508 | A | 6/1993 | Ninomiya et al. |
| 5,638,116 | A | 6/1997 | Shimoura et al. |
| 5,758,298 | A | 5/1998 | Guldner |

(Continued)

FOREIGN PATENT DOCUMENTS

JP   9218937   8/1997

OTHER PUBLICATIONS

Gianni Cario, Alessandro Casavola, Giuseppe Franze, Marco Lupia; "Predictive Time-to-Lane-Crossing Estimation for Lane Departure Warning Systems"; Italy; pp. 1-12; date unknown.

(Continued)

*Primary Examiner* — Matthew Bella
*Assistant Examiner* — Jose M Torres
(74) *Attorney, Agent, or Firm* — Price Heneveld LLP; Bradley D. Johnson (57) ABSTRACT

A system and method are disclosed for determining the presence and period of dashed line lane markers in a roadway. The system includes an imager configured to capture a plurality of high dynamic range images exterior of the vehicle and a processor, in communication with the at least one imager such that the processor is configured to process at least one high dynamic range image. The period of the dashed lane markers in the image is calculated for detecting the presence of the dashed lane marker and for tracking the vehicle within the markers. The processor communicates an output for use by the vehicle for use in lane departure warning (LDW) and/or other driver assist features.

20 Claims, 9 Drawing Sheets

(56) References Cited

U.S. PATENT DOCUMENTS

| | | | |
|---|---|---|---|
| 5,904,725 A | 5/1999 | Iisaka et al. | |
| 6,191,704 B1 | 2/2001 | Takenaga et al. | |
| 6,493,458 B2 | 12/2002 | Yasui et al. | |
| 6,546,118 B1 | 4/2003 | Iisaka et al. | |
| 6,813,370 B1 | 11/2004 | Arai | |
| 6,819,779 B1 | 11/2004 | Nichani | |
| 6,823,241 B2 | 11/2004 | Shirato et al. | |
| 6,850,628 B2 | 2/2005 | Shirato | |
| 6,868,168 B2 | 3/2005 | Tsuji | |
| 7,050,908 B1 | 5/2006 | Schwartz et al. | |
| 7,218,207 B2 * | 5/2007 | Iwano | G06K 9/00798 340/435 |
| 7,295,682 B2 | 11/2007 | Otsuka et al. | |
| 7,295,683 B2 | 11/2007 | Yamamoto et al. | |
| 7,307,655 B1 | 12/2007 | Okamoto et al. | |
| 7,388,475 B2 | 6/2008 | Litkouhi | |
| 7,679,498 B2 | 3/2010 | Pawlicki et al. | |
| 7,876,926 B2 | 1/2011 | Schwartz et al. | |
| 7,881,839 B2 | 2/2011 | Stam et al. | |
| 7,937,196 B2 | 5/2011 | Watanabe et al. | |
| 8,107,683 B2 | 1/2012 | Aoki et al. | |
| 8,239,085 B2 | 8/2012 | Fechner et al. | |
| 8,477,997 B2 | 7/2013 | Tamura et al. | |
| 8,643,723 B2 * | 2/2014 | Suzuki | G06K 9/00798 348/148 |
| 2004/0183663 A1 * | 9/2004 | Shimakage | G06K 9/00798 340/436 |
| 2006/0239509 A1 * | 10/2006 | Saito | G06K 9/6205 382/104 |
| 2007/0084655 A1 | 4/2007 | Kakinami et al. | |
| 2007/0107965 A1 | 5/2007 | Kakinami et al. | |
| 2009/0058622 A1 | 3/2009 | Hsieh et al. | |
| 2009/0201370 A1 * | 8/2009 | Otsuka | G06K 9/3233 348/148 |
| 2009/0245582 A1 * | 10/2009 | Sakamoto | G06K 9/00798 382/104 |
| 2009/0296987 A1 * | 12/2009 | Kageyama | G06K 9/00798 382/103 |
| 2010/0079590 A1 | 4/2010 | Kuehnle et al. | |
| 2010/0188507 A1 | 7/2010 | Kageyama et al. | |
| 2010/0231718 A1 | 9/2010 | Nakamori et al. | |
| 2010/0238283 A1 | 9/2010 | Kim | |
| 2011/0081049 A1 | 4/2011 | Walter et al. | |
| 2011/0205363 A1 * | 8/2011 | Suzuki | G06K 9/00798 348/148 |
| 2011/0216938 A1 | 9/2011 | Suzuki | |
| 2011/0216944 A1 | 9/2011 | Kawasaki et al. | |

OTHER PUBLICATIONS

Gayathiri Somasunddaram, Kavitha, K.I. Ramachandran; "Lane Change Detection and Tracking for a Safe-Lane Approach in Real Time Vision Based on Navigation Systems"; Department of Electrical and Electonics Engineering, Amrita School of Engineering, Ettimadai, Coimbatore; DOI: 10.5121/csit.2011.1231; pp. 345-361; date unknown.

Arata Takahashi, Yoshiki Ninomiya, Mitsuhiko Ohta, Makoto Nishida, Norishige Yoshikawa; "Image Processing Technology for Rear View Camera (1): Development of Lane Detection System"; R&D Review of Toyota CRDL; vol. 38, No. 2; May 15, 2003; pp. 31-36.

Yu Ren Lin and Yi Feng Su; "FPGA Implement of a Vision Based Lane Departure Warning System"; World Academy of Science, Engineering and Technology; Aug. 2011; pp. 669-674.

Bebbington et al.; "A Robust Heuristic Estimator for the Period of a Poisson Intensity Function"; Methodology and Computing in Applied Probability; Jun. 2004; pp. 441-462.

* cited by examiner

SYSTEM AND METHOD FOR PERIODIC LANE MARKER IDENTIFICATION AND TRACKING

CROSS REFERENCE TO RELATED APPLICATION

The present application is a divisional application under 35 U.S.C. §121 of U.S. application Ser. No. 13/559,994, filed Jul. 27, 2012, now U.S. Pat. No. 9,098,751, which claims the benefit of and priority to U.S. Provisional Patent Application No. 61/512,213, filed on Jul. 27, 2011, entitled "RAISED LANE MARKER DETECTION SYSTEM AND METHOD THEREOF, and U.S. Provisional Patent Application No. 61/512,158, filed on Jul. 27, 2011, entitled "COLLISION WARNING SYSTEM AND METHOD THEREOF" the disclosures of which are hereby incorporated herein by reference in their entirety.

FIELD OF THE INVENTION

The present invention relates generally to a driver assist system and method thereof, and more particularly, to a system for periodic lane marker identification and tracking.

BACKGROUND OF THE INVENTION

Road surface marking is well known in the art and is used on a road surface in order to convey official information. Road surface markings are used on paved roadways to provide guidance and information to drivers and pedestrians. Various road surface markings such as "dashed" road way markings are most often used to delineate traffic lanes and are typically painted using a white strip on the black roadway surface. Each dashed marker is approximately one meter in length.

SUMMARY OF THE INVENTION

According to an aspect of the present invention, a period lane marker system includes an imager configured to capture a plurality of high dynamic range images exterior of the vehicle where a processor is in communication with the imager. The processor is configured to process one or more captured high dynamic range images, such that lane markers in the image are detected. The system determines if the vehicle is within the detected lane markers such that the processor can communicate an output for alerting a driver to lane departure.

According to another aspect of the present invention, a method of detecting a periodic lane marker includes the steps of capturing at least one high dynamic range image and detecting a periodic lane marker in the scaled image for identifying a roadway lane. Thereafter, a determination is made if the vehicle will remain within the roadway lane such that an output is communicated to the vehicle when removed from the lane.

These and other features, advantages, and objects of the present invention will be further understood and appreciated by those skilled in the art by reference to the following specification, claims, and appended drawings.

DETAILED DESCRIPTION

Before describing in detail embodiments that are in accordance with the present invention, it should be observed that the embodiments reside primarily in combinations of method steps and apparatus components related to a vehicular system for determining roadway lane markers. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a vehicular system and method for determining roadway lane markers as described herein. The non-processor circuits may include, but are not limited to signal drivers, clock circuits, power source circuits, and user input devices. As such, these functions may be interpreted as steps of a method to determine roadway lane markers. Alternatively, some or all functions could be implemented by a state machine that has no stored program instructions, or in one or more application specific integrated circuits (ASICs) or field programmable gate array (FPGA), in which each function or some combinations of certain of the functions are implemented as custom logic. Of course, a combination of the two or more approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions, programs and ICs with minimal experimentation.

Figure 1:
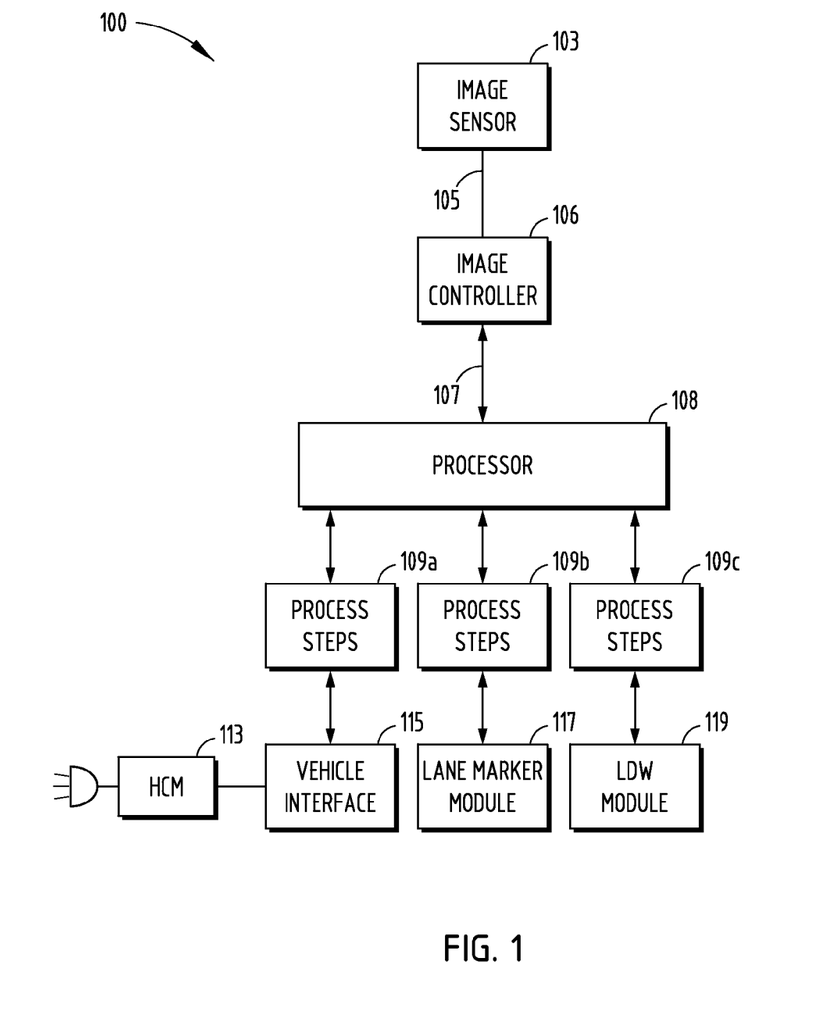
FIG. 1 is a block diagram illustrating a periodic lane marker identification and tracking system according to an embodiment of the invention.

FIG. 1 is a block diagram showing the vehicle equipment control system in accordance with an embodiment of the invention. The control system 100 includes a dedicated image controller 106 that is provided to control the image sensor 103 via a connection 105 and may also serve to perform pre-processing functions such as image auto-exposure, dynamic range compression, filtering, and/or color computation. The control system 100 may be one as described in U.S. Application Ser. No. 61/658,686, filed on Jun. 12, 2012, entitled "Vehicle Imaging System Providing Multi-Stage Aiming Stability Indication," assigned to Gentex Corporation and incorporated by reference herein in its entirety.

The image data is transmitted over a data link 107 to one or more processors 108. The processor 108 is typically a microprocessor configured discreetly or instantiated using various components such as a field programmable gate array (FPGA), or a combination of discrete and FPGA or the like. The processor 108 is configurable and/or adapted to perform a plurality of functions. These functions include but are not limited to headlamp control, lane departure warning and other driver assist features. The processor 108 may request images directly from the image controller 106 rather than directly controlling a camera such as an image sensor 103. The processor 108 can also request specific image data from the image controller 106 or may receive streaming image data on a periodic interval where the data is stored in an internal buffer. By way of example and not limitation, pixels received by the internal buffer can be stored in a plurality of rows in the buffer. Once the plurality of rows of data are stored, the data buffer can be used to determine colors, light peaks and/or objects, such as dashed lane markers, within the image while the image data is streamed. Those skilled in the art will recognize that other types of storage techniques can also be used depending on buffer size.

Subsequently, the image data that is received by the image controller 106 is used with one or more algorithms in various processing steps 109a, 109b, 109c. Each of the respective processing steps 109a, 109b, 109c is used in connection with the vehicle driver assist functions including but not limited to vehicle interface 115, lane marker module 117, headlamp control system, traffic sign recognition (TSR) and/or a lane departure warning (LDW) system 119 that is used for detecting lane marker position. The vehicle interface 115, such as a LIN or CAN bus, is typically used with a headlight control module 113 for controlling functions of vehicle lighting. In one application, the various processing steps work in combination with the lane marker module 117 for making a recommendation for altering the driver of lane departure and/or alternatively to process and directly control various functions of the vehicle. Those skilled in the art will recognize the lane marker module 117 can also control such functions of the vehicle headlights such as headlight intensity, lighting distribution and/or additional lighting features.

As described herein, the lane marker module 117 is used for determining and/or identifying the lane marker position on the roadway. Similarly, the LDW module 119 can be used in combination with the lane marker module 117 for alerting the driver of a lane departure. This information can also be used in connection with HCM 113. Those skilled in the art will also recognize that the image controller 106 may be provided integrally with the camera such as an image sensor 103 and/or can be integrated monolithically on the same silicon chip as an image sensor.

In the embodiments described herein, the image sensor 103 may be located on the mount of a vehicle rearview mirror or externally on the vehicle. Locating a camera on the mirror mount has several advantages, namely, the mount is rigid and stationary, the mirror mount is typically located in the vehicle's windshield wiper path, and the factory installation is simplified as the mirror is already being attached. Examples of such camera mounting and/or positioning can be found in U.S. Pat. Nos. 8,120,652; 8,646,924; and 8,814,373 which are commonly assigned to Gentex Corporation and all incorporated by reference herein in their entireties.

The camera or imager may be placed separate from the mirror, however, an additional factory installation step may sometimes be necessary. Regardless of the location of image sensor 103, both the image controller 106 and the processor 108 may be co-located with image sensor 103 on the same or separate circuit boards. The processor 108 may also be located in a rearview mirror body and may serve to perform additional functions such as a compass sensor and/or control of an auto-dimming or transflective rearview mirror. Similarly, these processors can also be located in a headliner, over-head console, or other suitable location in the vehicle.

In order to provide a stable and accurate lane model in lane tracking applications, it is important to consistently differentiate lane markers from road noise in images received by image sensor 103. Those skilled in the art will recognize that the term "noise" generally refers to unwanted objects in an image that degrade the quality and/or accuracy of data in the image. For example, road noise appears in an image which looks very much like a dashed lane marker but instead is a road patch, tire marking and/or residue left on the roadway.

Differentiating this type of noise may be especially difficult in situations where the lane markers are dashed lines since only a relatively small amount of the dashed marker is visible to the imager at a given point in time. This problem can be made worse in some LDW architectures where more weight is given to roadway models that have more data points available. When more data points are available, this data can sometimes work to only indicate a greater amount of road noise. Additionally, more relative weight is often given when identifying a solid line of noise relative to the dashed lane marker. One potential solution for identifying a dashed lane marker over road noise is to utilize the additional information inherent in dashed lane markers, e.g., a consistent period and duty cycle of the dashed lines. This information can then be used to increase the relative weight of the data points, i.e., the total number of data points for determining an average that conforms to these "expected" dashed characteristics. Once a lane marker is identified, this information can be used by the vehicle equipment control system as shown in FIG. 1.

In order to accurately classify a dashed lane marker in the roadway, several steps are generally required. Initially, a dashed line is used to identify an accurate world location. A world location might be the distance from the imager on the vehicle to the leading and/or trailing edges of the dashed lane or marker. In one embodiment, the world classification can be accurately determined using both the leading edge and trailing edge of one or more roadway dashes although determining the precise edges of the dashed lane marker is not necessarily required. This sometimes can be problematic as accuracy decreases with distance from the vehicle due to lower resolution per unit distance as well as any potential changes in road elevation. In addition, ego-motion of the vehicle can temporarily generate additional position error in the mathematical transformation from image to world-space. Egomotion is defined as the three-dimensional motion of a camera or imager within an environment. In the field of computer vision, egomotion generally refers to estimating a camera's motion relative to a rigid scene. As used in the present invention, egomotion estimation refers to estimating a vehicle's vertical motion relative to the road surface and does not refer to the vehicle's lateral movement.

Because of the difficulty in accurately measuring dash location at large distances from the vehicle (e.g., greater than 13 meters), various techniques and processes are used for utilizing available data in a region that is close to the vehicle. This in turn means that for determining a typical dashed line separation, only one dash, or portion of one dash, will be measured in any given frame. Thus, according to an embodiment of the invention, a method of dash start (leading edge) and end point (trailing edge) classification can also be used for reducing error.

Figure 2:
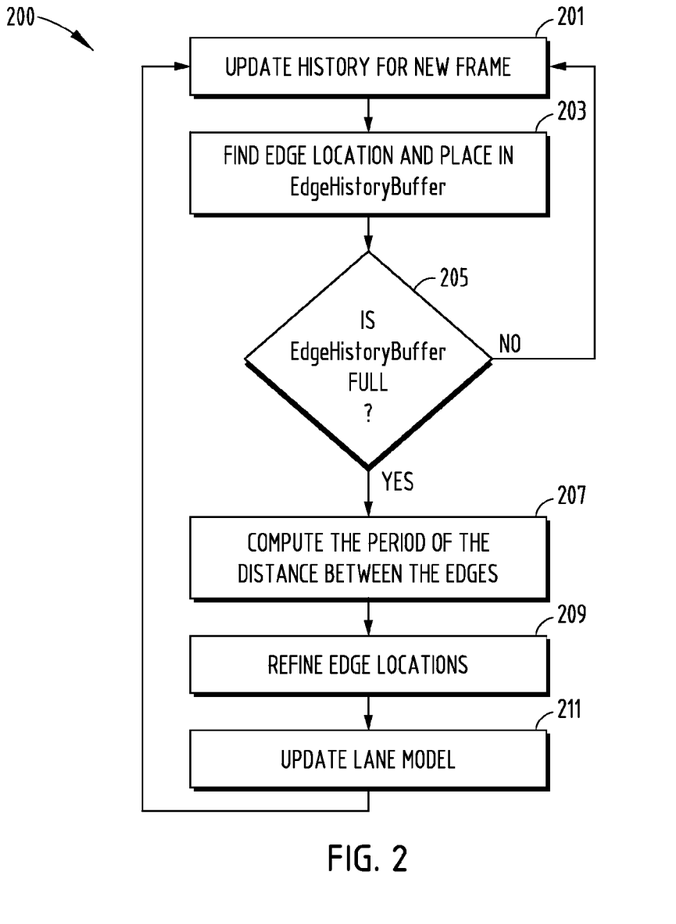
FIG. 2 is a flow chart diagram illustrating an algorithm utilized in an embodiment of the present invention for identifying and classifying roadway dash start and end points.

FIG. 2 is a flow chart diagram illustrating an algorithm utilized in an embodiment of the present invention for identifying period and classifying a dash start and dash end point. Because of the necessity to only measure dashes close to the vehicle, period calculation can be difficult to calculate. Instead, the dash start/end locations are first measured over a series of frames. Thereafter, the period is then calculated upon collection of data points. Those skilled in the art will recognize that the data point may be one single point scanned multiple times and/or the scanning of multiple data points.

As seen in the flow diagram 200 of FIG. 2, initially the "history" for a new frame received from the imager is updated 201. Thereafter, the period between roadway dashes is measured 207 for finding the dash edge locations. Those skilled in the art will recognize that the terms "dash" or "dashed" mean a series of broken lane lines that identify and/or separate lanes in a roadway. Further, the term "period" is generally defined as the distance upon which a roadway dashed line, which identifies a lane, will reoccur. A search range is defined and is then iterated over a candidate marker point in the search range. This range defines the road area upon which the imager will search for the dashed marker. While providing images within this range, a set of heuristics is applied to determine if a designated point corresponds to the leading edge or trailing edge of a dash.

The term "heuristics" refers to an experience-based technique for problem solving, learning, and/or discovering a solution. Where exhaustive mathematical calculations are impractical, heuristic methods are often used to speed up the process of finding a satisfactory solution. Such heuristic methods work to find and locate roadway dashed marker edges. In use, the heuristics used to determine dashed line period may include but are not limited to distance from near model (estimated LDW lane line location near the vehicle), point grouping characteristics, and the presence or absence of a zone with no other candidate points immediately before (leading edge) or immediately after (trailing edge) the candidate point. By way of example and not limitation, a typical search range used in the heuristic calculation is between 8-13 meters in front of the vehicle center.

Figure 2A:
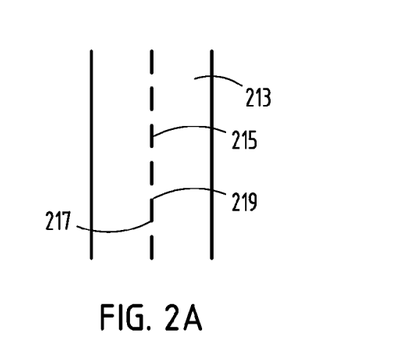
FIG. 2A is an illustration of a roadway lane.

FIG. 2A illustrates a top view of a typical dashed lane marker where the roadway 213 includes one or more dashed markers. Each dashed marker 215 includes a leading edge 217 and a trailing edge 219. As seen in the flow chart diagram of FIG. 2, after an edge location is located using heuristics or other techniques, it is stored in an edge history buffer 203. A predetermined amount of edge location data is generally stored in the edge history buffer 203 until it is substantially full and/or includes enough data to make an accurate determination of period between dashed lines. A determination is then made if the edge history buffer is full 205. If not entirely full, the history for a new frame is again updated 201 and the process continues until the edge history buffer is substantially full and/or near capacity. However, when the edge history buffer is substantially full, this enables the data to be used to calculate the period of the reoccurring dashed line by using the distance between the leading and trailing edges of the dashed marker 207. Once the dashed line period is calculated, the edge locations can be further refined 209 and the lane model can again be updated 211 using this new data.

Once a point is determined that corresponds to a dash edge in step 203, various methods can be used for recording the presence of each subsequent edge using distance calculations. Those skilled in the art will recognize that an "absolute" position of the dash refers to the position relative to a fixed point using the road as a frame of reference. Thus, a vehicle start location would be initially set at x=0 m and then using a current vehicle location such as x=200, a subsequent dash location can be calculated using the current vehicle location by adding the dash location, for example, where a dash location x=200 m+12 m or 212 m. In contrast, a "relative" position of the dash refers to the dash's distance with respect to a vehicle frame of reference such as the vehicle center. Since vehicle speed and elapsed time are generally known from other vehicular sensors, a relative distance from vehicle to the dashed edges can be determined. Using this technique, a location of the dash is directly measured in relative coordinates (i.e., x meters in front of vehicle center) and then transformed to absolute coordinates via knowledge of the vehicle's absolute position as calculated from Eq. 1 below.

In determining the dashed line period, using actual time directly as a parameter is typically not advisable since it can cause error due to the changing vehicle speed. Based upon the numerical values of both vehicle speed and elapsed time, the absolute distance of the dashed line from the vehicle $d_n$ can be calculated using the Eq. 1 where $v_n$ is velocity of the vehicle at point n and $t_n$ is elapsed time at point n:

$$d_n = d_{n-1} + V_n + (t_n - t_{n-1})$$

$$d_0 = 0 \qquad \text{Eq. 1}$$

Those skilled in the art will further recognize that using the algorithm in the distance equation can sometimes cause an accumulation of error in absolute position of the dashed lines. Therefore, this type of equation may be best suited dashed marker edges that occur over substantially short lengths of time (e.g., less than 1 second).

Figure 3:
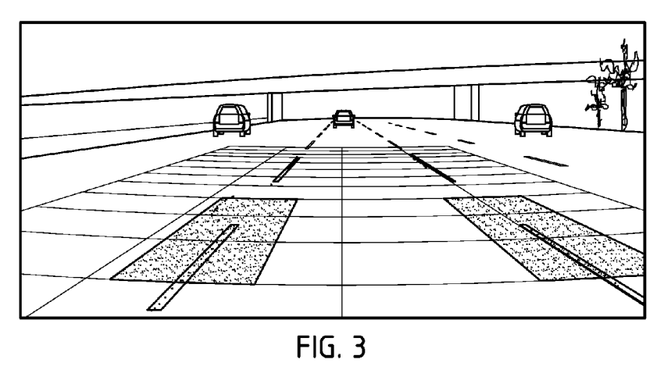
FIG. 3 is a histogram diagram illustrating unfiltered lane period and period resonance.

Once a predetermined number of edge values has been collected that substantially fill the buffer, the period of occurrence of the dashed lane marker lines can be calculated. Those skilled in the art will further recognize that any technique chosen to calculate the lane marker period must be accurate and robust enough to accommodate error in position measurements, noise that was incorrectly identified as a dash edge, and missing dash edges. Thus, several methods can be used for determining the dashed line period. FIG. 3 is an illustration showing a search region used by the imager for determining dashed edge lines. An overlay box is used in connection with the imaging device for determining period calculation. The overlay box shows how images can be taken over a stretch of road with varying degrees of line quality and noise.

One technique for determining lane line period is to apply a fast Fourier transform (FFT) to a sum of Gaussian values in order to find the dominant frequency of dashed lane marker occurrence. These "dominant" frequencies can then be inverted to determine the period such that the period of occurrence is equal to 1/frequency. Still another possible solution for refining edge location is to model the distance measurements as a homogeneous Poisson point process. Those skilled in the art will recognize that the Poisson point process is a stochastic process which counts the number of events and the time that these events occur in a given time interval. The time between each pair of consecutive events has an exponential distribution with parameter λ and each of these inter-arrival times is assumed to be independent of other inter-arrival times. A more detailed explanation of the Poisson point process is described in the publications by Cox & Isham, 1980, Poisson Process, 2011, as well as Shao & Lii, 2009, which are herein incorporated by reference in their entirety. Those skilled in the art will further recognize that the solution using the Poisson point process is a histogram technique that is similar to a Fourier Transform in period space.

Figure 4:
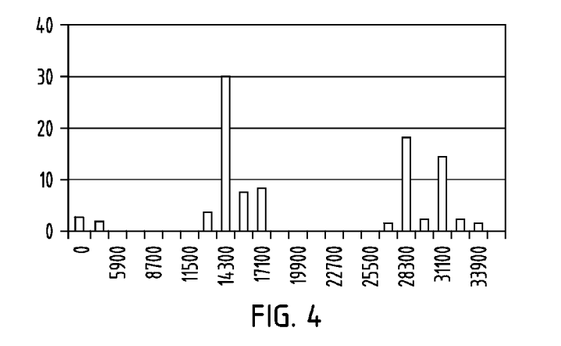
FIG. 4 is an illustration showing a search region used by the imager for determining dashed edge lines.

FIG. 4 is a histogram diagram illustrating edge differences in calculating a dashed line marker period. The diagram illustrates an example where the period is approximately 14 meters and resonance is approximately a 28 meter bin. As seen in the x axis, the resulting histogram magnitudes give the number of times each period range is indicated in the edge comparisons. The period is shown in millimeters as the y axis. In using the histogram, if the signal-to-noise ratio of the edge locations is considered adequate, there will be a peak at the period. In addition, if twice the period is in the histogram range, it is likely to show as a peak.

Figure 5:
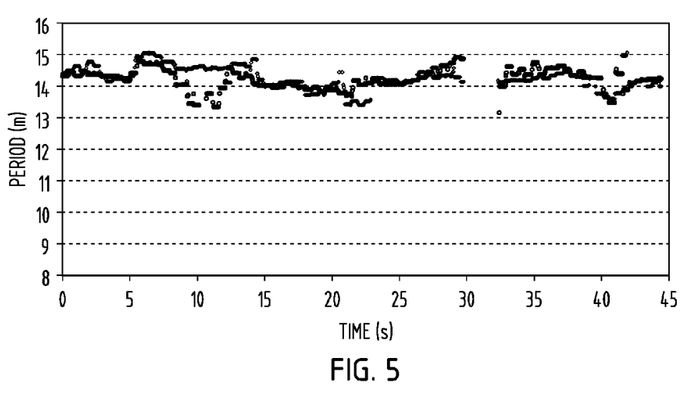
FIG. 5 is an illustration showing the leading and trailing edge period values over a stretch of road with a varying degree of line quality and noise.

FIG. 5 is a diagram illustrating a raw period measured over time as calculated by a leading edge and trailing edge. In the illustration one shade illustrates a leading edge while another shade is a trailing edge and ideally these will give substantially equal values. Typically, the edge locations used for period calculation can be imprecise and error prone. In order to obtain improved accuracy, the diagram shows how large numbers of these points taken over a substantially long period of time can be used in aggregate to determine a more accurate lane line period. However, as described herein, it is possible to refine the location of these edge location values using other techniques such as a noise removal filter. This would allowed a lesser number of points to be used to also provide a highly accurate lane line period calculation.

Figure 6:
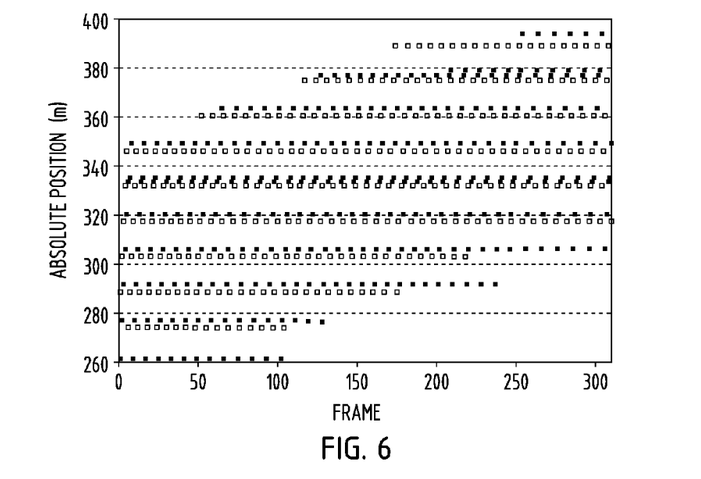
FIG. 6 is a diagram illustrating dashed leading edges and trailing edges, locations in absolute position versus the number of frames as seen by the imager of the present invention.

FIG. 6 is diagram illustrating dashed line leading edges (solid dot) and trailing edge (hollow dot) locations showing absolute distance from vehicle center versus the number of imaging frames. For example, the data illustrates a concentration of lane line edge point data at approximately 330 meters using a range between 100-200 imaging frames. The absolute position data can be used with elapsed time as one technique for calculating lane line period.

Figure 7:
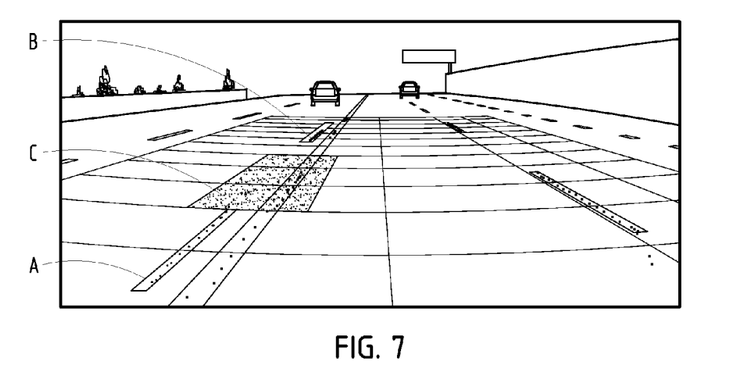
FIG. 7 is an illustration showing a proposed dead zone filtering location technique.

FIG. 7 is an illustration of a roadway using a noise removal filter technique known as "dead zone" filtering. In the illustration, the region A is a located dash while the B region is an estimated location of the next dash and the C region is a dead zone. In using such techniques, general period results have error of less than approximately +/−½ meter on a typical stretch of road and error of less than approximately +/−1 meter on more difficult sections of road having more vehicle movement. In use, the period measurement performance over a section of road shows a large variation in dash quality. The illustration shows less than 60 seconds of drive time where the vehicle moves over substantially large road bumps. This can cause significant egomotion of the vehicle when moving back and forth in the lane. Those skilled in the art will recognize that varying accuracy will occur under differing road and environmental conditions.

In order to determine false positives on non-dashed roads, several sections of solid-line markers can be processed with techniques known as signal-to-noise (S/N) ratio filtering. These techniques can be successful in suppressing the detection of false dashes. For example, refined edge location measurements can be used where additional filtering can be performed in order to remove false detection of lines. Those skilled in the art will recognize that accuracy can be increased by increasing scan line density in this region, or by performing a more general edge detection algorithm. As an estimation is often used for the configurable parameters in any such algorithm, these parameters may include but are not limited to such variables as tracking distance, minimum and maximum dash period, search area and histogram buffer size. Further, periodicity can also be calculated for Botts' Dots using this technique. If edge location estimation were replaced by an algorithm to find candidate Botts' Dots location, this might be an alternative solution to determine edge marker position.

Figure 8:
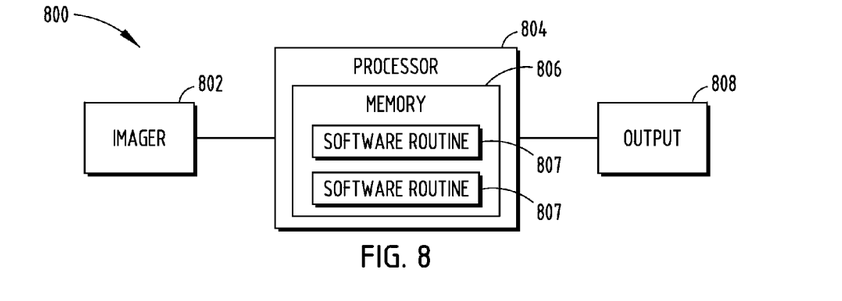
FIG. 8 is a block diagram of a raised lane marker detection system, in accordance with one embodiment of the present invention.

In accordance with still another embodiment of the invention, FIG. 8 illustrates a lane detection system, which can be configured to detect raised lane markers, generally shown at reference identifier 800. The lane detection system 800 includes an imager 802 configured to capture image data, and a processor 804 in communication with the imager 802, wherein the processor 804 can be configured to process the image data to detect at least one raised lane marker (e.g., Botts' Dots).

The processor 804 can include a memory 806 and be configured to execute one or more executable software routines 807 to process the image data received from the imager 802 to determine if a raised lane marker is being imaged. The lane detection system 800 can be configured to emit an output 808 based upon one or more detected raised lane markers, such as, but not limited to, if it is determined that the controlled vehicle is likely to cross over a raised lane marker (or a line between two raised lane markers), such as, but not limited to, a lane detection warning. Additionally or alternatively, the memory 806 can be external to the processor 804, such that the processor 804 and memory are communicatively connected. It should be appreciated by one skilled in the art that the processor 804 can be one processor or a plurality of processors communicatively connected. The output 808 can be an audible output, a visual output, a tactile output, a mechanical output that controls the controlled vehicle, a message communicated via a universal asynchronous receiver/transmitter (UART), a controller-area network (CAN) bus, an ENET bus, or other suitable connection, the like, or a combination thereof.

The controlled vehicle can be a vehicle that includes a lane detection system 800, without regard to the type of output 808, according to one embodiment. The imager 802 can be located anywhere on the controlled vehicle, so that at least part of the captured image is a scene exterior of the controlled vehicle. Thus, the imager 802 can be located behind an interior rearview assembly; on a front, rear, or side panel of the controlled vehicle, or the like; or a combination thereof.

Figure 9:
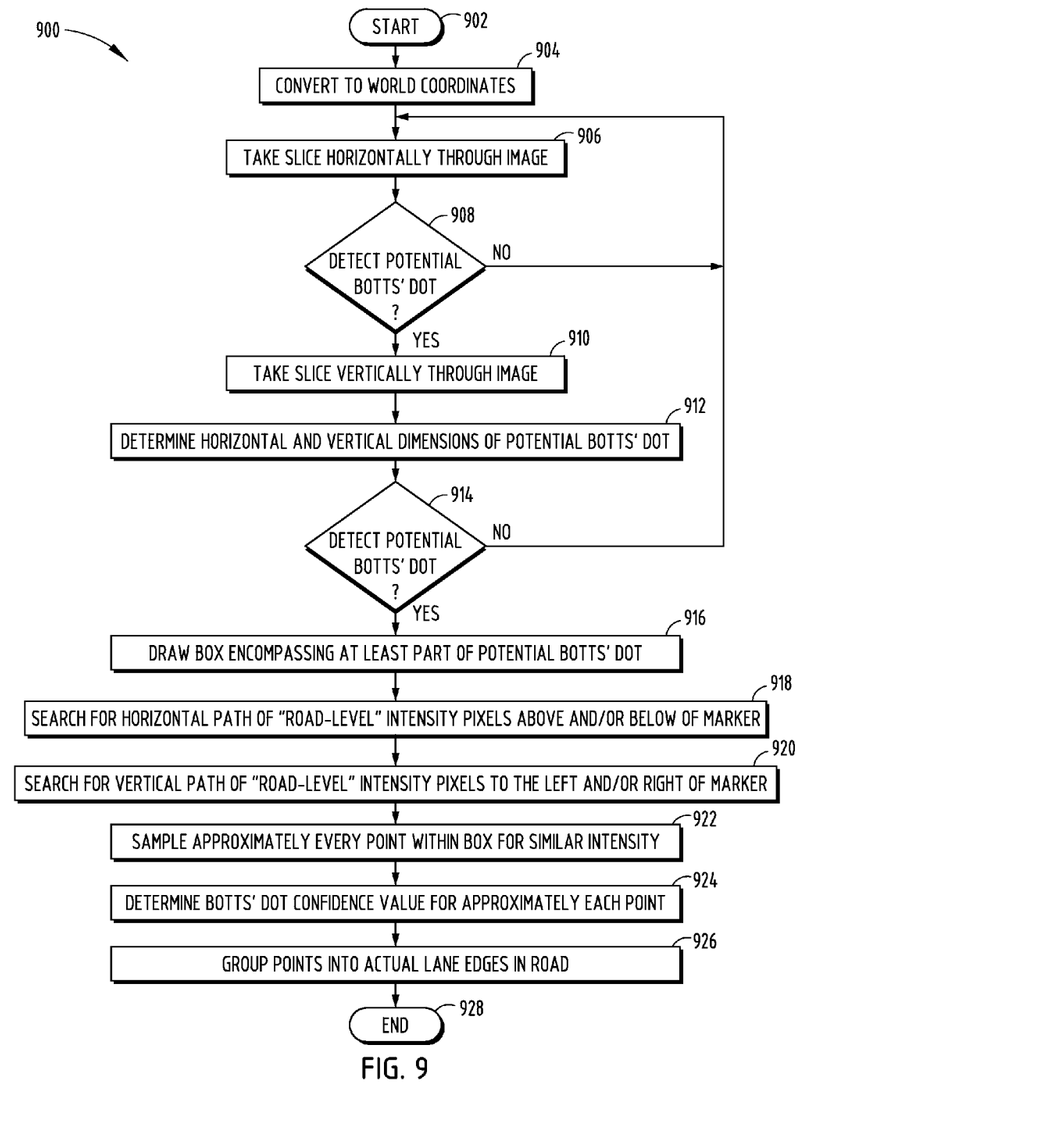
FIG. 9 is a flow chart illustrating a method of detecting a raised lane marker, in accordance with one embodiment of the present invention.

With regard to both FIGS. 8 and 9, a method of detecting a raised lane marker is generally shown in FIG. 9 at reference identifier 900. The method 900 starts at steps 902, and proceeds to step 904, wherein image data received from the imager is converted to world coordinate data. At step 906, a slice is taking horizontally though the image, and at decision step 908 it is determined if a potential raised lane marker is detected. If it is determined at decision step 908 that a potential raised lane marker is not detected, then the method 900 returns to step 906. However, if it is determined at decision step 908 that a potential raised lane marker is detected, then the method proceeds to step 910. According to an alternate embodiment, the method 900 proceeds from step 906 to step 910, such that a vertical slice is always taken without regard to the result of the horizontal slice.

At step 910, a vertical slice is taken through the image, and at step 912, horizontal and vertical dimensions of potential raised lane markers are determined. It is determined if a potential raised lane marker is detected at decision step 914. If it is determined at decision step 914 that a potential raised lane marker is not detected, then the method 900 returns to step 904. Typically, it is determined if a potential raised lane marker is detected by computing a vertical width based upon the vertical slice of the image, computing a horizontal width based upon the horizontal slice of the image, and comparing the vertical width to the horizontal width, such that if there isn't enough vertical width, then it is determined that there is no detection of a potential raised lane marker. However, if it is determined at decision step 914 that a potential raised lane marker is detected, then the method 900 proceeds to step 916.

A box encompassing at least part of the raised lane marker is drawn at step 916, and at step 918, horizontal path of "road level" intensity pixels are searched for above and/or below the marker. At step 920, vertical path of "road level" intensity pixels are searched to the left and/or right of the marker. Typically, searching the horizontal and vertical paths of pixels, which can correspond to a dark circle of road around a raised lane marker. Approximately every point within the box is sampled for a substantially similar intensity, at step 922, and a raised lane marker confidence value for approximately each point is determined at step 924. At step 926, points are grouped into actual lane edges in the road, and the method 900 then ends at step 928.

Figure 10:
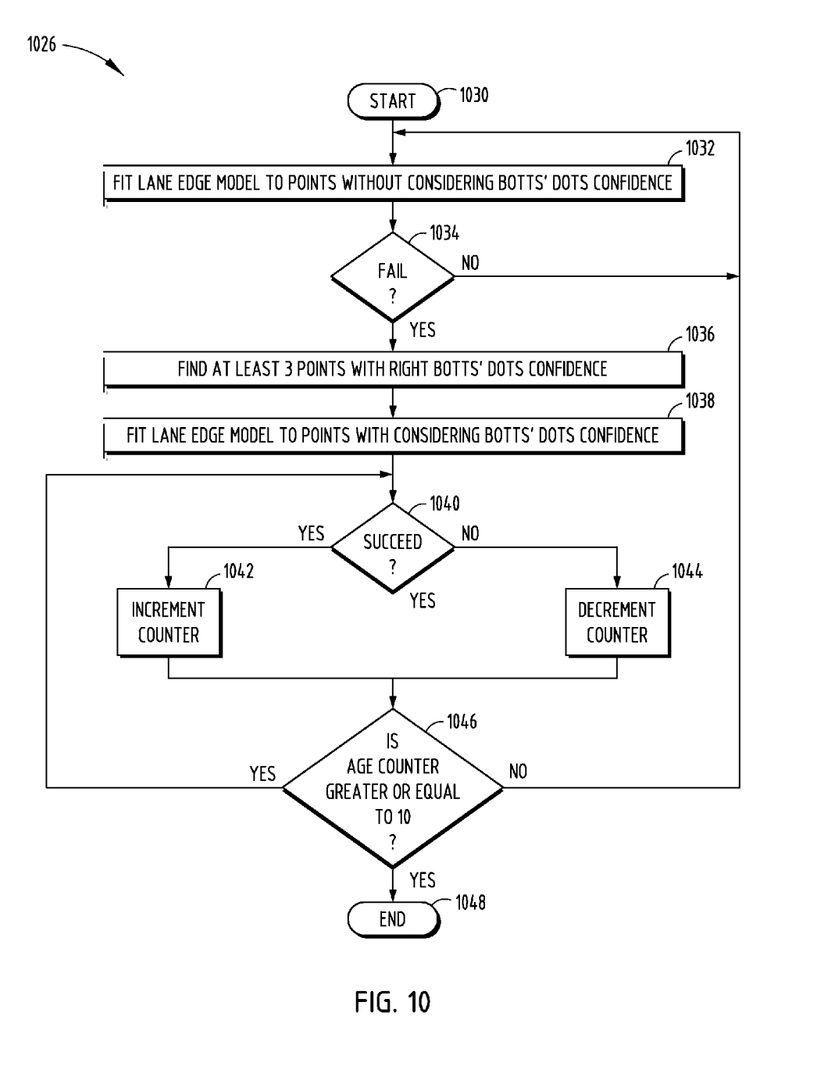
FIG. 10 is a flow chart illustrating a method of grouping points into actual lane edges in a road, in accordance with one embodiment of the present invention.

With respect to FIGS. 8-10, the step of grouping points into actual lane edges in a road is generally shown in FIG. 10 at reference identifier 1026. The method of grouping points 1026 starts at step 1030, and proceeds to step 1032, wherein a lane edge model is fit into points without considering a raised lane marker confidence. At decision step 1034 it is determined if the fitting of the lane edge model failed. If it is determined that fitting the lane edge model to points does not fail, then the method returns to step 1032. However, if it is determined at decision step 1034 that fitting the lane edge model fails, then the method 926 proceeds to step 1036.

At step 1036, at least three points are found with high raised lane marker confidence, and at step 1038, lane edge model is fit to points while considering raised lane marker confidence. At decision step 1040, it is determined if the fitting of the lane edge model was successful. If it is determined at decision step 1040 that the fitting of the lane edge model to points while considering a raised lane marker confidence is successful, then the method 1026 proceeds to step 1042, wherein a counter is incremented. However, if it is determined at decision step 1040 that the fitting of the lane edge model to points while considering a raised lane marker confidence is not successful, then the method 1026 proceeds to step 1044, wherein a counter is decremented.

At decision step 1046, it is determined if an age of the counter is greater than or equal to a threshold value. Typically, the threshold value is 10, but it should be appreciated that the threshold value can be varied, including dynamic variation, to other values to change a sensitivity of the system 800. If it is determined at decision step 1046, that the counter has an age that is greater than or equal to the threshold value, then the method 1026 returns to step 1040. However, if it is determined at decision step 1046, that the counter has an age that is less than the threshold value, then the method 1026 returns to step 1032. The method 1026 can then end at step 1048. It should be appreciated by those skilled in the art that the system 800 and method 900 can continuously detect raised lane markers, such that the method 900 continues to be performed so long as the system 800 is powered on.

According to one embodiment, the imager 802 is a charge coupled device CCD imager or a CMOS imager. Exemplary imagers are described in U.S. Pat. No. 7,432,967, entitled "CONTROL CIRCUIT FOR IMAGE ARRAY SENSORS," U.S. Pat. No. 6,008,486, entitled "WIDE DYNAMIC RANGE OPTICAL SENSOR," U.S. Pat. No. 7,567,291, entitled "VEHICLE VISION SYSTEM," U.S. Pat. No. 7,683,326, entitled "VEHICLE VISION SYSTEM WITH HIGH DYNAMIC RANGE," U.S. Pat. No. 7,423,821, entitled, "IMPROVED VISION SYSTEM," U.S. Pat. No. 8,289,430, entitled "HIGH DYNAMIC RANGE IMAGING DEVICE," 8,305,471, entitled "IMAGING DEVICE," and U.S. Pat. No. 8,629,927 entitled "IMPROVED IMAGING DEVICE," all of which are entirely hereby incorporated herein by reference. Advantageously, the system 800 and method 900 can detect at least one raised lane marker. It should be appreciated by those skilled in the art that the system 800 and method 900 may have additional or alternative advantages. It should further be appreciated by those skilled in the art that the system 800 and method 900 can have components or steps, respectively, which are combined in combinations not explicitly described herein.

Figure 11:
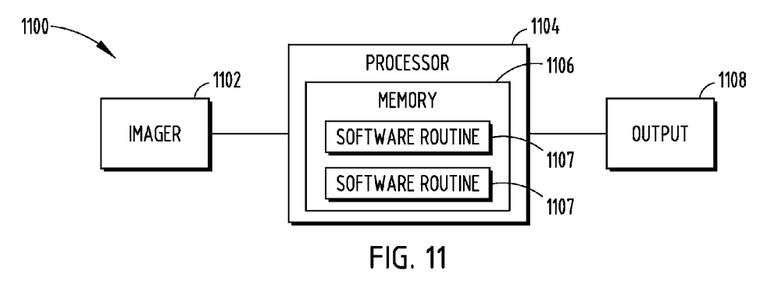
FIG. 11 is a block diagram of a collision warning system, in accordance with one embodiment of the present invention.

In reference to FIG. 11, a driver assist system, which can be a collision warning system, is generally shown at reference identifier 1100. The driver assist system 1100 includes an imager 1102 configured to capture image data, and a processor 1104 in communication with the imager 1102, wherein the processor 1104 is configured to process the image data to detect at least one object and determine if (or a probability of) a controlled vehicle that includes the driver assist system 1100 is going to contact (or collide with) the object if the controlled vehicle continues on the current drive path.

The processor 1104 can include a memory 1106 and be configured to execute one or more executable software routines 1107 to process the image data received from the imager 1102 to determine if the controlled vehicle is likely to contact an object, and emit an output 1108 if it is determined that the controlled vehicle is likely to contact the object. Additionally or alternatively, the memory 1106 can be external to the processor 1104, such that the processor 1104 and memory are communicatively connected. It should be appreciated by one skilled in the art that the processor 1104 can be one processor or a plurality of processors communicatively connected. The detected object can be a static object (e.g., wall, guard rail, sign, etc.), a pedestrian, an animal, a moving object such as a vehicle, the like, or a combination thereof. The output 1108 can be an audible output, a visual output, a tactile output, a mechanical output that controls the controlled vehicle, a message communicated via a universal asynchronous receiver/transmitter (UART), a controller-area network (CAN) bus, an ENET bus, or other suitable connection, the like, or a combination thereof.

The controlled vehicle can be a vehicle that includes a driver assist system 1100, without regard to the type of output 1108, according to one embodiment. The imager 1102 can be located anywhere on the controlled vehicle, so that at least part of the captured image is a scene exterior of the controlled vehicle. Thus, the imager 1102 can be located behind an interior rearview assembly; on a front, rear, or side panel of the controlled vehicle, or the like; or a combination thereof.

Figure 12:
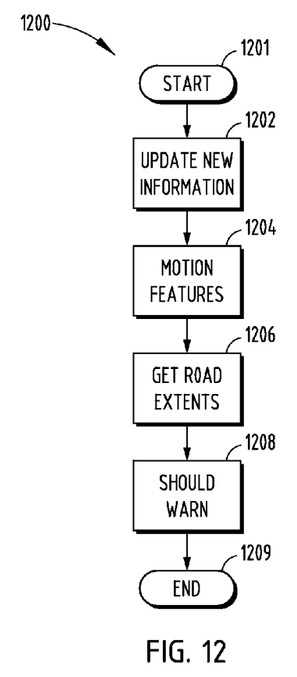
FIG. 12 is a flow chart of a method of a collision warning system, in accordance with one embodiment of the present invention.

As to FIGS. 11 and 12, a Method of Warning of a Vehicle Collision is Generally Shown in FIG. 12 at reference identifier 1200, wherein the steps of the method 1200 can be implemented in the imager 1102, the processor 1104, other hardware (or hardware executing software) in communication with the imager 1102 and/or the processor 1104, the like, or a combination thereof. The method 1200 starts at step 1201, and optionally can update new information at step 1202. Typically, the update of new information includes a task to transform a high dynamic range image into an image having a lower dynamic range (e.g., a 0-255 grayscale image). Thus, the lower dynamic range image can be used for optical flow calculations. A dynamic log scaling of the high dynamic range image can be performed to account for the range of low to high light conditions. Scaling parameters can be set approximately in real time for each frame.

The method 1200 can proceed from step 1202 to step 1204, wherein motion of features are detected. Typically, the detection of motion features can be a function for detecting one or more objects in the scene and determining if the detected objects are on a collision course with the controlled vehicle. If a history of edge motion is obtained, how the edge will move in a current frame can be predicted and/or a group's motion can be predicted based upon a history, as described in greater detail herein.

Figure 14A:
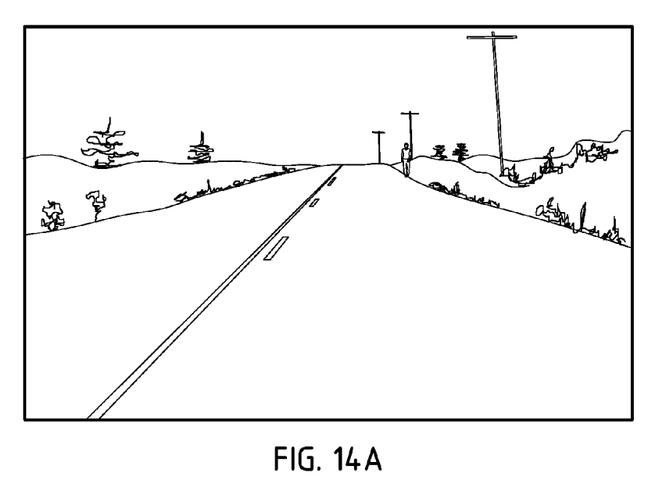
FIG. 14A is an exemplary captured image with overlay lines for detecting the road a controlled vehicle is traveling along, in accordance with one embodiment of the present invention.
Figure 14B:
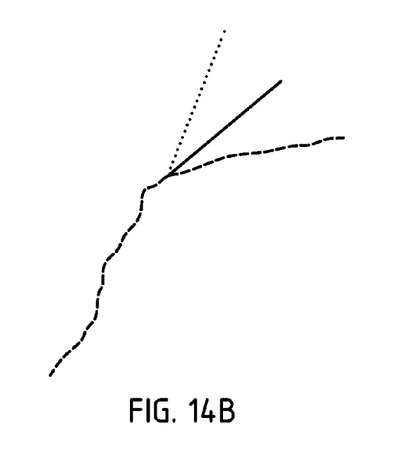
FIG. 14B is a diagram illustrating various possibilities of road curvature, in accordance with one embodiment of the present invention.
Figure 14C:
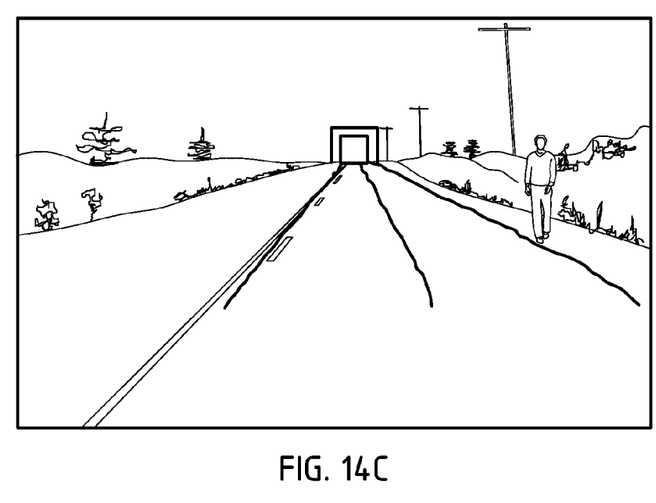
FIG. 14C is an exemplary captured image with overlay lines, in accordance with one embodiment of the present invention.
Figure 14D:
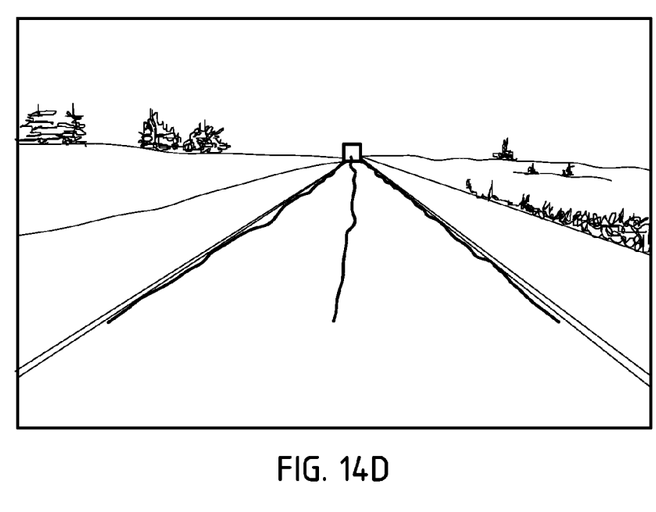
FIG. 14D is an exemplary captured image with overlay lines, in accordance with one embodiment of the present invention.

At step 1206, the method 1200 can get road extents. Typically, getting road extents can include segmenting the road (or lane if markings are solid) up to a first object, and using segmentation to create an enlarged bounding box in an image space, wherein all groups of objects generating a warning must be within the image space. Segmenting the road (or lane) can include moving out from an approximate center of the controlled vehicle row by row (in grid space) until a large deviation in color is found. Thus, when segmentation jumps in on a row, the location within the row can be determined to be a starting point of an object. Since road edges are approximately smooth, there is a limited amount that an edge can move from row to row (in world coordinates) between images (FIGS. 14A and 14B). An end of the road can be determined and identified (e.g., indicated by a box), such that any object outside the box can be ignored as not likely to collide with the controlled vehicle (FIGS. 14C and 14D).

The method 1200 can proceed from step 1206 to step 1208, wherein it is determined if the output 1108 should be emitted, and the method 1200 can then end at step 1209. Typically, the processor 1104 determines whether an output (or warning) 1108 should be emitted based upon one or more criteria. By way of explanation and not limitation, the criteria can include warnings based upon time to collision between approximately zero and two seconds, a focus of expansion for a group being within a bounding box around a group to collide with an approximate center of the controlled vehicle, an age of the imaged object (with respect to previous frames) larger than a threshold age, the like, or a combination thereof. A vertical location of a focus of expansion can filter out overhead signs.

Figure 13:
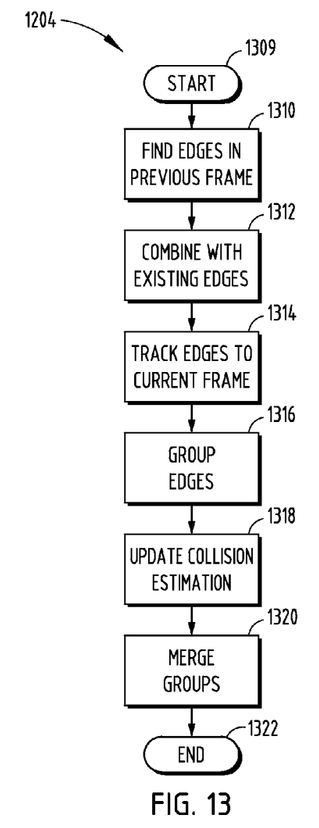
FIG. 13 is a flow chart of a method of detection of motion of objects in captured images, in accordance with one embodiment of the present invention.

With respect to FIGS. 12 and 13, step 1204 of method 1200 is generally shown in FIG. 13 at reference identifier 1204, according to one embodiment. Detecting motion of features starts at step 1309 and proceeds to step 1310, wherein one or more edges in a previous frame is found. Typically, finding one or more edges in a previous frame includes processing the previous frame (e.g., the previous frame is not processed until the current frame is captured), and the found edges can be used in an optical flow estimation. For purposes of explanation and not limitation, Sobel vertical and horizontal edge detection using gradient pyramids can be used, connected components in the image can be applied to form edges, discard a new edge if the new edge is too close to a previously tracked edge, and/or a thickness of edges can be reduced to find a center line. However, it should be appreciated by those skilled in the art that additional and/or alternative edge detection techniques can be utilized.

Detecting motion of features can also include combining edges with existing edges at step 1312. According to one embodiment, combining edges with existing edges includes comparing newly detected edges (e.g., edges found in the most recent frame processed) to a list of previously detected edges (or current edges). Current edges can be projected in the previous image, such that location and direction of the edge can be utilized to eliminate repeat edges.

At step 1314, edges of the current image can be tracked. Typically, tracking edges of a current image includes monitoring a list of edges from a previous frame to a current frame. For example, the list of edges can be monitored by utilizing a pyramid of gradient and smooth images that were calculated in step 1310 to align an edge to intensity in the current frame. The edges can be trimmed, wherein exterior portions of edges that are no longer strong can be eliminated (or less evaluated). Invalid edges can be removed, wherein edges that are no longer strong or have been trimmed to near zero length can be eliminated (or less evaluated). Removing invalid edges can also include eliminating (or giving less weight to) groups that no longer contain an edge.

The detected edges can be grouped at step 1316, wherein edges can be grouped into clusters representing individual objects. According to one embodiment, the edges can be grouped by fitting new edges into existing groups, and form one or more new groups for the remaining edges (e.g., the edges that did not fit into an existing group). Typically, to fit into a group, edges have an acceptable vertical or horizontal overlap, have a substantially consistent focus of expansion, have a substantially consistent time to collision, the like, or a combination thereof. The group's motion can be projected forward, and the time to collision and focus of expansion of the group can be averaged over time.

A collision estimate can be determined at step 1318, wherein the focus of expansion and time to collision estimation can be filtered for each group. Typically, the focus of expansion is filtered by using a weighted average, which can include, but is not limited to, weighting recent values higher, and/or weighting higher frames with low error in focus of expansion estimates for all edges within the group. Time to collision can be filtered using a weighted average, wherein recent values are weighted higher.

After the collision estimate at step 1318, groups can be merged at step 1320. Typically, two or more groups are merged if the groups are substantially consistent. By way of explanation and not limitation, groups are determined to be substantially consistent if the groups are close in image space, groups have a substantially consistent time to collision, groups have a consistent focus of expansion, the like, or a combination thereof. It should be appreciated by those skilled in the art that additional or alternative considerations can be utilized to merge groups.

According to one embodiment, the system 1100 and method 1200 find and track one or more features in an image, group features into objects (which are present over multiple frames), calculate a collision estimation (e.g., calculate time to collision and focus of expansion for approximately every detected object), extract road data (which can be used to limit collision), and if the time to collision is small, a focus of expansion is inside a group, and if the group is on the road, alert the driver. Typically, the system 1100 and method 1200 track edges rather than points, predict motion, estimate time to collision and focus of expansion, compensate for curves, estimate road extents, auto-scale the captured image, the like, or a combination thereof.

According to one embodiment, the imager 1102 is a charge coupled device CCD imager or a CMOS imagers. Exemplary imagers are described in U.S. Pat. No. 7,432,967, entitled "CONTROL CIRCUIT FOR IMAGE ARRAY SENSORS," U.S. Pat. No. 6,008,486, entitled "WIDE DYNAMIC RANGE OPTICAL SENSOR," U.S. Pat. No. 7,567,291, entitled "VEHICLE VISION SYSTEM," U.S. Pat. No. 7,683,326, entitled "VEHICLE VISION SYSTEM WITH HIGH DYNAMIC RANGE," U.S. Pat. No. 7,423,821, entitled, "IMPROVED VISION SYSTEM," U.S. Pat. No. 8,289,430, entitled "HIGH DYNAMIC RANGE IMAGING DEVICE," and U.S. Pat. No. 8,305,471, entitled "IMAGING DEVICE," and U.S. Pat. No. 8,629,927 entitled "IMPROVED IMAGING DEVICE," all of which are entirely hereby incorporated herein by reference.

Advantageously, the system 1100 and method 1200 can detect objects in one or more images to determine a likelihood of the controlled vehicle colliding with the object, and emit an output to warn of an impending collision. It should be appreciated by those skilled in the art that the system 1100 and method 1200 may have additional or alternative advantages. It should further be appreciated by those skilled in the art that the system 1100 and method 1200 can have components or steps, respectively, which are combined in combinations not explicitly described herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

We claim:

1. A system for periodic lane marker identification comprising:
   at least one imager configured to capture image data corresponding to a plurality of images exterior of a vehicle;
   a processor in communication with the at least one imager wherein the processor is configured to:
      convert the image data from a relative coordinate system to a world coordinate system;
      process a first sample of the image data in a first direction and a second sample of the image data in a second direction to identify a potential raised road marker;
      define a box encompassing at least a portion of the potential raised road marker based on the first sample and the second sample; and
      identify a detected raised road marker from the potential raised road marker based on an intensity of a plurality of points located in the box.

2. The system according to claim 1, wherein the first sample corresponds to a substantially horizontal slice of the image data along the first direction.

3. The system according to claim 1, wherein the second sample corresponds to a substantially vertical slice of the image data along the second direction.

4. The system according to claim 1, wherein the potential raised road marker corresponds to a dark circle of road around the raised road marker in the image data.

5. The system according to claim 1, wherein the processing of the first sample and the second sample comprises identifying a first width along the first direction and a second width along the second direction.

6. The system according to claim 5, further comprising comparing the second width to the first width to determine if the second width is sufficiently long to correspond to a potential raised road marker relative to the second width.

7. The system according to claim 1, wherein the processor continues to define the box in response to a positive identification of the potential raised road marker based on the first sample and the second sample.

8. The system according to claim 7, wherein the detected raised road marker is further identified based on a raised lane marker confidence value calculated based on the intensity of the plurality of points located in the box.

9. A system for periodic lane marker identification comprising:
   at least one imager configured to capture image data corresponding to a plurality of images exterior of a vehicle;
   a processor in communication with the at least one imager wherein the processor is operable to:
      convert the image data from a relative coordinate system to a world coordinate system;
      process a first slice of the image data in a first direction to identify a potential raised road marker;
      in response to identifying the potential raised road marker in the first direction corresponding to the potential raised road marker, process a second slice in a second direction to identify a second intensity of pixels proximate to the potential raised road marker;
      compare a first width of the first intensity of pixels to a second width of the second intensity of pixels to further identify the potential raised road marker; and
      in response to the further identification of the raised road marker, identify a detected raised road marker from the potential raised road marker based on an intensity of a plurality of points located in a box defined by the first intensity of pixels and the second intensity of pixels.

10. The system according to claim 9, wherein the second slice is located proximate to the potential raised road marker.

11. The system according to claim 9, wherein the first direction is substantially perpendicular to the second direction.

12. The system according to claim 9, wherein the processor is further operable to:
   in response to identifying that the first intensity of pixels in the first direction does not correspond to the potential raised road marker, search a different portion of the image data in the first direction to identify the first intensity of pixels corresponding to the potential raised road marker.

13. The system according to claim 9, wherein the first intensity of pixels corresponds to a horizontal width of the potential raised lane marker and the second intensity of pixels corresponds to a vertical width of the potential raised lane marker.

14. The system according to claim 13, wherein the further identification of the potential raised lane marker comprises determining if the second width is sufficiently long relative to the first width to correspond to a potential raised road marker.

15. The system according to claim 9, wherein the processor is further operable to:
   identify a detected raised road marker based on a raised lane marker confidence value based on an intensity of a plurality of points of the potential raised road marker.

16. A system for periodic lane marker identification comprising:
   at least one imager configured to capture image data corresponding to a plurality of images exterior of a vehicle;
   a processor in communication with the at least one imager wherein the processor is configured to:
      convert the image data from a relative coordinate system to a world coordinate system;
      process a first slice of the image data in a horizontal direction to determine a first width;
      detect a potential raised lane marker from the first slice of the image data, wherein:
         upon not detecting the potential raised lane marker, the processor processes the first slice of a different portion of the image data to detect the potential raised lane marker; and
         upon detecting the potential raised lane marker, the processor processes a second slice of the image data in a vertical direction to determine a second width to identify a potential raised road marker; and
      further identify the potential raised road marker by comparing the first width to the second width.

17. The system according to claim 16, wherein the further identification of the potential raised lane marker comprises determining if the second width is sufficiently long relative to the first width to correspond to a potential raised road marker.

18. The system according to claim 16, wherein the processor is further configured to define a box encompassing at least a portion of the potential raised road marker based on the first width and the second width.

19. The system according to claim 18, wherein the processor is further configured to identify a detected raised road marker from the potential raised road marker based on an intensity of a plurality of points located in the box.

20. The system according to claim 19, wherein the detected raised road marker is further identified based on a raised lane marker confidence value calculated based on the intensity of the plurality of points located in the box.

* * * * *